United States Patent
LaForest et al.

(10) Patent No.: US 9,875,407 B2
(45) Date of Patent: Jan. 23, 2018

(54) HYPERSPECTRAL IMAGE ACQUISITION SYSTEM AND METHOD

(71) Applicant: COMMISSARIAT A L'ENERGIE ATOMIQUE ET AUX ENERGIES ALTERNATIVES, Paris (FR)

(72) Inventors: Timothé LaForest, Sivignon (FR); Antoine Dupret, Orsay (FR); William Guicquero, Bures-sur-Yvette (FR); Arnaud Verdant, Saint Nazaire les Eymes (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 430 days.

(21) Appl. No.: 14/715,413

(22) Filed: May 18, 2015

(65) Prior Publication Data

US 2015/0332081 A1    Nov. 19, 2015

(30) Foreign Application Priority Data

May 19, 2014    (FR) ...................... 14 54453
May 18, 2015    (EP) ...................... 15168023

(51) Int. Cl.
*G01J 3/28*     (2006.01)
*G06K 9/00*     (2006.01)
*G01J 3/12*     (2006.01)

(52) U.S. Cl.
CPC .......... *G06K 9/0063* (2013.01); *G01J 3/2823* (2013.01); *G01J 2003/1213* (2013.01); *G06K 2009/00644* (2013.01)

(58) Field of Classification Search
CPC ........ G06K 9/0063; G06K 2009/00644; G01J 3/2823; G01J 2003/1213
USPC ...................................................... 356/326
See application file for complete search history.

(56) References Cited

U.S. PATENT DOCUMENTS

| | | | |
|---|---|---|---|
| 2006/0038705 A1 | 2/2006 | Brady et al. | |
| 2010/0141950 A1* | 6/2010 | Katsunuma | G01J 3/02 356/432 |
| 2014/0240514 A1* | 8/2014 | Love | G01J 3/2823 348/164 |

OTHER PUBLICATIONS

Tebow, Christopher, et al. "CGH disperser model for a tunable snapshot imaging spectrometer." Symposium on Integrated Optoelectronic Devices. International Society for Optics and Photonics, 2002.

Institut National De La Propriété Industrielle, Preliminary Search Report for French Patent Application No. 1454453, dated Feb. 3, 2015, 2 pages.

Goenka C., et al. "Tunable filters for multispectral imaging of aeronomical features." Advances in Space Research 52.7 (2013): 1366-1377.

(Continued)

*Primary Examiner* — Hina F Ayub
(74) *Attorney, Agent, or Firm* — Kevin R. Erdman; Brannon Sowers & Cracraft PC

(57) ABSTRACT

A system for acquiring a hyperspectral image, including: a grey level image sensor; and a diffuser and dispersive element placed on the optical path between the sensor and a scene, this element including an array of individually-controllable liquid crystal cells, where each cell can receive a control voltage selected from among a series of at least three different control voltages.

20 Claims, 1 Drawing Sheet

(56) References Cited

OTHER PUBLICATIONS

Liutkus, Antoine, et al. "Imaging with nature: compressive imaging using a multiply scattering medium." Scientific reports 4 (2014).
Arguello Fuentes, H., and Gonzalo R. Arce. "Coded aperture compressive spectral imaging." Image, Signal Processing, and Artificial Vision (STSIVA), 2013 XVIII Symposium of. IEEE, 2013.
Wagadarikar, Ashwin, et al. "Single disperser design for coded aperture snapshot spectral imaging." Applied optics 47.10 (2008): B44-B51.
Elad, Michael, and Arie Feuer. "Restoration of a single superresolution image from several blurred, noisy, and undersampled measured images." Image Processing, IEEE Transactions on 6.12 (1997): 1646-1658.
Gundu, Phanindra, Erwin Hack, and Pramod Rastogi. "High efficient superresolution combination filter with twin LCD spatial light modulators." Optics express 13.8 (2005): 2835-2842.
August, Yitzhak, and Adrian Stern. "Compressive sensing spectrometry based on liquid crystal devices." Optics letters 38.23 (2013): 4996-4999.

\* cited by examiner

HYPERSPECTRAL IMAGE ACQUISITION SYSTEM AND METHOD

CROSS-REFERENCE TO RELATED APPLICATIONS

The present application claims priority under 35 U.S.C. § 119 of French Patent Application Serial Number 14/54453, filed May 19, 2014, and European Patent Application Serial Number 15168023.8, filed May 19, 2015 the disclosures of which are incorporated by reference herein.

BACKGROUND

The present disclosure relates to a hyperspectral or multispectral image acquisition system and method, and to the calibration of such a system or method.

DISCUSSION OF RELATED ART

"Hyperspectral or multispectral image of a scene" generally designates a series of a plurality of elementary images in two dimensions of the scene, each image representing a component of the scene in a restricted wavelength band. Each elementary image generally corresponds to the integration of the light intensity in a specific spectral band. In the following, expression "hyperspectral image" is considered as being equivalent to expression "multispectral image" and designates a series of at least two elementary images of a same scene in different spectral bands.

To acquire a hyperspectral image, a method comprises successively acquiring the different images of the series by means of an image sensor, by arranging on each acquisition, between the scene and the sensor, an optical bandpass filter of narrow bandwidth, for example, from a few nanometers to a few tens of nanometers, corresponding to one of the components of the hyperspectral image. For each new acquisition, a new filter is arranged between the scene and the sensor, to successively select the different spectral bands of the hyperspectral image.

A major disadvantage of this method is the need to have the different optical filters successively pass between the scene and the sensor. This results in relatively bulky acquisition systems and in relatively long acquisition times. Once the acquisition is ended, the information contained in each elementary image corresponds to the integration of the light intensity in the pass-band of the corresponding filter.

Another method comprises using, instead of the filter, a prism, to spatially disperse the different wavelengths of the scene. An array system of programmable shutters, of the type currently called SLM in the art ("Spatial Light Modulator") may be placed between the scene and the prism, upstream of the image sensor. The SLM is for example formed by an array of micro-mirrors or by an array of liquid crystal cells. According to the desired spatial and spectral resolutions, an acquisition or a small number (that is, smaller than the total number of spectral bands of the hyperspectral image) of acquisitions may be sufficient to reconstruct the hyperspectral image. This type of method is generally called CASSI in the art ("Coded Aperture Snapshot Spectral Imaging").

A disadvantage of this method however is the complexity of the optical system necessary to carry out the acquisition, and the relatively low resolution of the elementary images which may be simultaneously acquired by the sensor.

Other methods have been provided, for example, in article "Compressive sensing spectrometry based on liquid crystal devices" of Yitzhak August et al., using the theories of compressive acquisition to reconstruct the different components of an extended spectrum based on a small number of acquisitions. In the above-mentioned article, an electrically-controllable liquid crystal filter is arranged between the scene and an image sensor. During an acquisition, a control voltage is applied to the filter, so that the latter, instead of selecting a narrow bandwidth as in conventional methods, selects a wide bandwidth of irregular shape, corresponding to a juxtaposing of the wavelengths of the different components of the hyperspectral image, to which weighting coefficients are assigned. A plurality of acquisitions are successively performed, by each time modifying the control of the liquid crystal filter, which amounts to modifying the filter response and thus the weighting coefficients assigned to the components of the hyperspectral image. The authors have shown that by using the mathematical models of compressive acquisition, it is possible to reconstruct a series of elementary components of the extended spectrum based on a number of acquisitions smaller than the total number of spectral bands of the reconstructed series.

A disadvantage of this method however is the complexity of the calibration of the liquid crystal filters, and the limited possibilities in terms of compression or of super-resolution.

There is a need for a hyperspectral image acquisition system and method overcoming all or part of the disadvantages of known solutions.

SUMMARY

Thus, an embodiment provides a system for acquiring a hyperspectral image, comprising: an image sensor; a diffuser and dispersive element placed on the optical path between the sensor and a scene, this element comprising an array of liquid crystal cells, each cell being individually controllable to vary its refraction index; a control unit capable of controlling the sensor and the element to successively acquire an integral number M greater than 1 of elementary images of the scene, by modifying between two successive acquisitions a set of control signals applied to the different cells of the element; and a processing unit capable of reconstructing the hyperspectral image based on the M elementary images acquired by the sensor.

According to an embodiment, for each set of control signals applied to the element, the element has different point spread functions for different spectral bands of the hyperspectral image.

According to an embodiment, the M sets of control signals applied to the diffuser and dispersive element are such that the acquisition matrix, formed by the concatenation of the representations of the M×K point spread functions of the element, corresponding to the M applied sets of control signals and to K spectral bands of the hyperspectral image, K being an integer greater than 1, is of maximum rank relative to its size.

According to an embodiment, the M sets of control signals applied to the diffuser and dispersive element are such that the M×K point spread functions of the element, corresponding to the M applied sets of control signals and to K spectral bands of the hyperspectral image, K being an integer greater than 1, are all different from one another.

Another embodiment provides a method of controlling the above-mentioned system, comprising an acquisition phase during which the sensor and the element are controlled to successively acquire an integral number M greater than 1 of elementary images of the scene, by modifying between two successive acquisitions the set of control signals applied to the different cells of the element.

According to an embodiment, the control method further comprises a phase of reconstructing the hyperspectral image based on the M elementary images acquired during the acquisition phase.

According to an embodiment, the control method further comprises a previous calibration phase during which the M×K point spread functions of the element, corresponding to the M sets of applied control signals and to K spectral bands of the hyperspectral image, K being an integer greater than 1, are determined.

According to an embodiment, the calibration phase comprises the acquisition successively by the sensor of M×K images of spots resulting from the diffusion, by the element, for the M sets of control signals of the element and for the K light spectral bands of the hyperspectral image, of a point light source having a settable wavelength or having a known and settable spectral signature.

According to an embodiment, the M×K images acquired during the calibration phase are matched with a theoretical behavior model of the element.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

Figure 1:
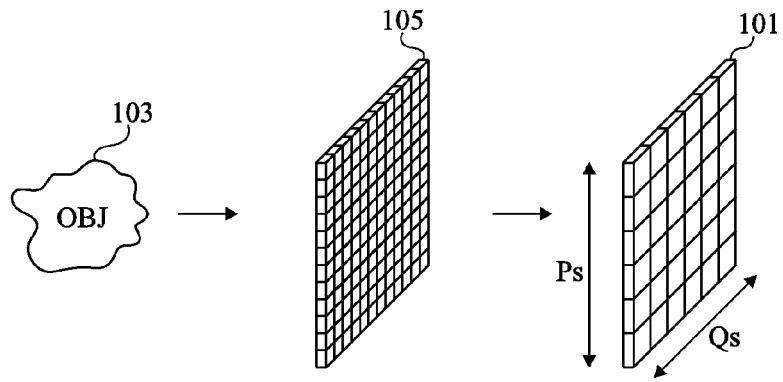
FIG. 1 schematically and partially shows an embodiment of a hyperspectral image acquisition system.

For clarity, the same elements have been designated with the same reference numerals in the different drawings.

FIG. 1 schematically and partially shows an embodiment of a hyperspectral image acquisition system.

The system of FIG. 1 comprises an image sensor 101, for example, an array of photodetectors, capable of providing images in grey levels. Image sensor 101 is a wide-band sensor, that is, it is sensitive to all the wavelengths of the hyperspectral images which are desired to be acquired.

The system of FIG. 1 further comprises, on the optical path between sensor 101 and an object or a scene 103 (OBJ) for which a hyperspectral image is desired to be acquired, a programmable diffuser and dispersive element 105, comprising an array of liquid crystal cells individually controllable to vary their refraction indexes. The liquid crystals of element 105 are liquid crystals having a refraction index depending on the wavelength, and preferably liquid crystals having their wavelength dispersion varying according to the applied bias voltage, for example, liquid crystals of the type commercialized by MERCK under reference TL216 or under reference E44. As a non-limiting example, each elementary cell may have dimensions in the range from 1 to 10 µm for applications in the visible range. In practice, element 105 may comprise a continuous liquid crystal layer having a first surface coated with a continuous common electrode and having a second surface opposite to the first surface covered with an array network of individually-controllable discrete elementary electrodes. In this case, an elementary cell of element 105 is formed by the portion of the liquid crystal layer arranged between an elementary electrode and the common electrode.

In this example, object 103 for which a hyperspectral image is desired to be acquired is assumed to be located at infinity. Possibly, a complementary optical system, not shown, may be arranged between the object and element 105 so that object 103 appears at infinity from the viewpoint of element 105.

The system of FIG. 1 may further comprise one or a plurality of memories (not shown) capable of storing one or a plurality of digital images acquired by sensor 101, a calculation unit (not shown), for example, a microprocessor, capable of processing images acquired by sensor 101, and/or a control unit of sensor 101 and of diffuser and dispersive element 105.

The operation of the system of FIG. 1 will now be described.

During a phase of acquisition of a hyperspectral image of object 103, sensor 101 successively acquires M images $y_m$ of object 103 seen through diffuser and dispersive element 105, where M is an integer greater than 1 and m is an integer in the range from 1 to M.

On acquisition of an image $y_m$, diffuser and dispersive element 105 is modulated by a set of control signals $C_m$, that is, a set of signals for controlling the different liquid crystal cells of element 105. Each set of control signals enables to generate a specific map of refraction indexes on the liquid crystal array. In the described embodiments, instead of being controlled to be shut/opened as in a SLM of a CASSI-type system, each cell may receive a control voltage selected from a series of at least three different voltages, and preferably from a series of at least ten different voltages, corresponding to at least three, respectively to at least ten, different refraction indexes (for a given wavelength). Preferably, element 105 is such that, for a given control signal set $C_m$ of element 105, there is no refraction index discontinuity at the border between two adjacent cells of the array, so that the liquid crystal layer of element 105 is perceived as a non-discrete element (that is, continuous or analog). The M sets of control signals $C_m$ applied to element 105 during the M image acquisitions by sensor 105 are all different from one another. For each set of control signals Cm of element 105, element 105 has a point spread function PSF which varies according to the wavelength of the rays received by element 105 (dispersive character of element 105). For a given set of control signals $C_m$ of element 105 and for a given wavelength, the PSF of element 105 forms a diffusion spot, preferably uneven, capable of spreading over a plurality of photodetectors of sensor 101 and preferably over the most part of the surface of sensor 101 (diffusing character of element 105). Defining the PSF of element 105, for a given wavelength, with the image of the spot, in the plane of sensor 101, resulting from the diffusion by element 105 of a beam originating from a point light source at this wavelength, sets Cm of control signals are preferably selected so that the M×K PSFs of element 105 (K being an integer greater than 1 corresponding to the number of spectral bands of the hyperspectral image which is desired to be acquired) are sufficiently decorrelated from one another. As an example, a group of M sets of control signals of element 105 may be selected from among a group of sets of control signals generated based on Zernike polynomials to minimize the intercorrelation maximum and the autocorrelation maximum of the PSFs. As an example, a group of sets of control signals adapted for a given wavelength may be selected, after which a bias capable of minimizing the correlation of the PSFs on the spectral axis may be determined for each set of control signals in the group. Preferably, for a given set of control signals, the spectral deviation of the PSF between two successive spectral bands of the hyperspectral image to be acquired is smaller than or equal to a pixel of the sensor, to avoid certain spectral artifacts. In terms of compressive acquisition, it may further be desired to minimize the mutual coherence between the acquisition matrix (relative to the PSFs) and the base where the hyperspectral images which are desired to be acquired are parsimonious. Further, to define sets of control signals enabling to generate orthogonal PSFs for a given wavelength, a non-negative principal component analysis of a group of PSFs generated from sets of control signals originating from Zernike polynomials may be performed. It is then possible to return to the sets of control signals associated with the orthogonal PSFs by means of an algorithm enabling to recover the wavefronts corresponding to the generated PSFs.

Sets $C_m$ of control signals are preferably selected so that, for a given set of control signals $C_m$ and for a given wavelength, the PSF of element 105 is substantially the same at any point of element 105. In other words, sets $C_m$ of control signals are preferably selected so that, for a given set of control signals $C_m$ and for a given wavelength, the image resulting from the object in the plane of sensor 101 corresponds to the convolution of the image of the object by a convolution kernel corresponding to the PSF associated with the considered set of control signals $C_m$ and with the considered wavelength. If such is not the case, a correction of the distortion may be incorporated to the hyperspectral image reconstruction algorithm. It should be noted that such a distortion may depend on several parameters, including the discretization of dispersive element 105, its size and its shape, as well as the possible influence of its temperature gradient. It will be within the abilities of those skilled in the art to adapt the used secondary optical systems to minimize their impacts in terms of distortion while taking into account the influence of element 105.

For each set of control signals $C_m$ of element 105, different liquid crystal cells of element 105 are controlled to have different refraction indexes (for each wavelength) to create phase shifts of the wavefront at the output of element 105 (and more generally at the output of the general optical system comprising element 105), enabling to generate uneven diffusion spots or PSFs. As an example, sets $C_m$ of control signals correspond to sets of control signals enabling to generate known PSFs, for example, PSFs originating from aberrations of the wavefront corresponding to Zernike polynomials or to a combination of such polynomials. The case of astigmatism aberrations or of spherical aberrations coupled with a bias or tilt should in particular be noted as a non-limiting example.

As will be explained in further detail hereafter, the inventors have determined that based on the M fuzzy images $y_m$ acquired by sensor 101 during the acquisition phase, it is possible to restore a hyperspectral image x comprising K elementary images $x_{\lambda k}$ corresponding to the components of image x in the different spectral bands $\lambda_k$ of image x (k being an integer in the range from 1 to K). The calculations enabling to reconstruct hyperspectral image x based on the M images $y_m$ will be detailed hereafter. Such calculations may be implemented either by means of a calculation unit integrated to the acquisition system, or by an external processing unit.

A sufficient discretization of hyperspectral image x along the axis of the different spectral bands will be assumed hereafter, so that the step of this discretization is small as compared with the variations of the spectral signatures observable on each pixel. Number M of images $y_m$ necessary to reconstruct spectral image x depends on the parsimony of image x in a given representation base (that is, on its structural complexity), on its spatial and spectral resolution, and on the coherence of the acquisition matrix equivalent to the convolutions performed by the different PSFs (the stronger the correlation between the different PSFs, the higher the number of images $y_m$ necessary for the reconstruction of image x).

Figure 2:
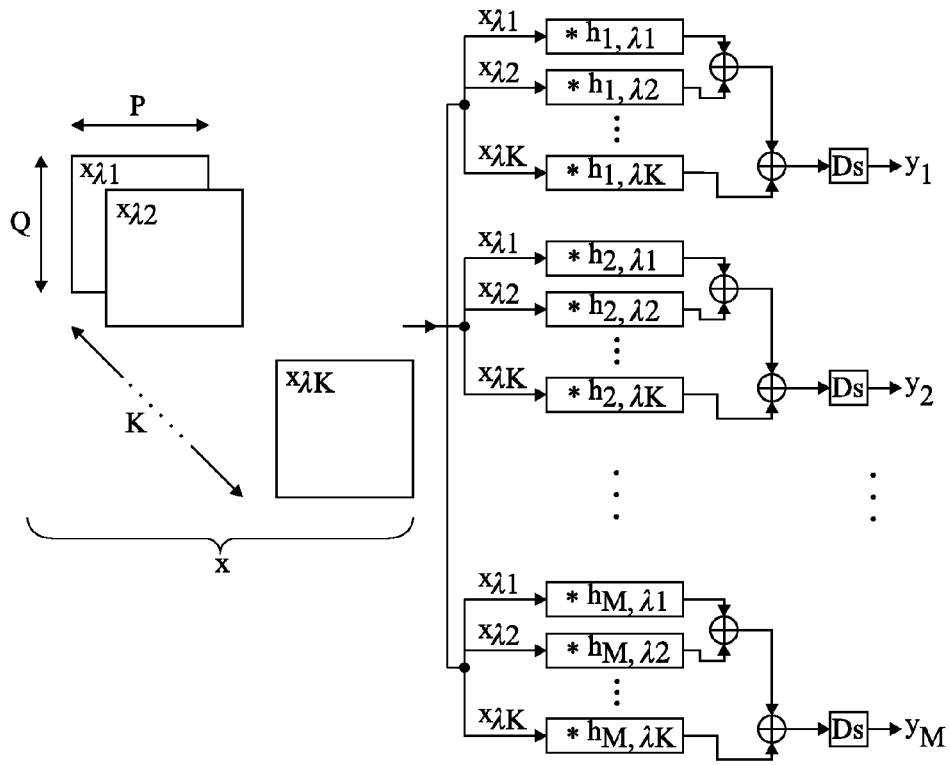
FIG. 2 is a diagram illustrating the operating principle of the hyperspectral image acquisition system of FIG. 1.

$h_{m,\lambda k}$ designates the convolution kernel corresponding to the effect of the PSF of element 105 on the light of spectral band $\lambda k$, when element 105 receives set of control signals $C_m$. Considering that the desired elementary images $x_{\lambda k}$ have a resolution P×Q greater by a factor s than resolution Ps×Qs of sensor 101, with P, Q, s, $P_s$, and $Q_s$ being integers, $P_s$=P/s and $Q_s$=Q/s, and considering that the M×K PSFs of element 105 may be defined with a granularity level or discretization step identical to that of images $x_{\lambda k}$, each image $y_m$ acquired by sensor 101 may be analytically expressed with the following formula:

$$y_m = D_s\left(\sum_{k=1}^{K} h_{m,\lambda k} * x_{\lambda k}\right),$$

where * represents the convolution operator (non cyclic), and where $D_s$ designates an operator of decimation by factor s, for example, an averaging operator, corresponding to the spatial decimation, by sensor 101, of hyperspectral image x. FIG. 2 shows a simplified modelization of this equation.

It is first considered that a hyperspectral image x at the same spatial resolution $P_s \times Q_s$ as sensor 101 is desired to be obtained, and that the M×K PSFs of element 105 can be defined with a granularity level corresponding to resolution $P_s \times Q_s$ of the sensor. Operator $D_s$ can thus be omitted (case s=1). Convolution operations in the spatial domain correspond to point-by-point multiplications or Hadamard products in the Fourier domain. The above-mentioned equation can then be approximated as follows:

$$Y_m = \sum_{k=1}^{K} H_{m,\lambda k} \cdot X_{\lambda k},$$

where '.' represents the Hadamard product, $Y_m$ is the Fourier transform of image $y_m$, $H_{m,\lambda k}$ is the Fourier transform of convolution kernel $h_{m,\lambda k}$ (possibly completed with zeros if the dimensions of kernel $h_{m,\lambda k}$ are smaller than the dimensions of image $x_{\lambda k}$), and $X_{\lambda k}$ is the Fourier transform of elementary image $x_{\lambda k}$. It should be noted that edge effects may, if need be, be compensated by using methods of zero-padding type, that is, by increasing the size of the matrixes and by completing them with zeros.

For each pixel of spatial coordinates p,q of hyperspectral image x, where p is an integer in the range from 1 to P and q is an integer in the range from 1 to Q, this equation may be expressed in the form of a simple matrix multiplication, as follows:

$Y(p,q)=G(p,q)X(p,q)$, where Y(p,q) is a vector of dimension M, containing the M values of the pixel of coordinates p,q in the M Fourier transform images Ym, X(p,q) is a vector of dimension K containing the K values of the pixel of coordinates p,q in the K Fourier transform images $X_{\lambda k}$, and G(p,q) is a matrix of dimensions M×K containing the M×K values of the pixels of coordinates p,q in the M×K Fourier transforms $H_{m,\lambda k}$ of convolution kernels $h_{m,\lambda k}$.

The case where number M of acquisitions performed by sensor 101 is equal to number K of elementary images of the desired hyperspectral image x is considered. Matrixes G(p, q) then are square matrixes. If the M×K PSFs of element 105 are sufficiently decorrelated from one another, square matrixes G(p,q) may be inverted or pseudo-inverted. The M sets $C_m$ of control signals of element 105 are preferably selected so that square matrixes G(p,q) are invertible. Each vector X(p,q) of the Fourier transform hyperspectral image may be directly calculated by a simple matrix multiplication according to the following formula:

$$X(p,q) = G(p,q)^{-1} Y(p,q),$$

where G(p,q)−1 designates inverted or pseudo-inverted matrix G(p,q). The different elementary images $x_{\lambda k}$ of hyperspectral image x can then be reconstructed by simple inverse Fourier transform operations.

More generally, be matrix G(p,q) square or not, the M sets of control signals $C_m$ of element 105 are preferably selected so that the acquisition matrix, formed by the concatenation of the representations of the different PSFs in the spatial and spectral fields, is of maximum rank relative to its size. The size of the acquisition matrix is defined for its number of rows, that is, the number of acquired data, and its number of columns, that is, the number of data which are desired to be reconstructed.

An advantage of the above-described hyperspectral image acquisition system is that it is particularly simple and of low bulk. In particular, it is not necessary to provide a mechanism enabling to mechanically change the optical filter located between the sensor and the scene between the different acquisitions. Further, the forming of element 105 is relatively simple since element 105 should not perform an accurate conventional optical filtering function, but only introduce fuzziness into the image, the only constraint being for the M×K PSFs of element 105 to have a good level of decorrelation relative to one another.

It should be noted that matrixes $G(p,q)^{-1}$ may be predetermined, and stored in a memory of a hyperspectral image reconstruction unit. Matrixes $G(p,q)^{-1}$ may further optionally be preconditioned to avoid certain errors due to edge effects.

More generally, if the number of pixel values effectively acquired is smaller than the number of pixel values to be reconstructed, for example, if number M of acquisitions performed by sensor 101 is smaller than number K of elementary images of the hyperspectral image x which is desired to be reconstructed, and/or if spatial resolution P×Q of hyperspectral image x is greater than resolution p×q of sensor 101 (case s>1), image x may be reconstructed by means of an iterative regularization method of the type used in compressive acquisition, corresponding to the resolution of a minimization problem formulated as follows:

$$\operatorname{argmin}_x \left( J(x) + \gamma \sum_{m=1}^{M} \left\| D_s \sum_{k=1}^{K} h_{m,\lambda k} * x_{\lambda k} - y_m \right\|_2^2 \right),$$

where J(x) corresponds to a regularization operator enabling to exacerbate the internal structure of the hyperspectral image and γ is a scalar regularization parameter. As a non-limiting example, operator J(x) is based on five gradient operators $\nabla_1$, $\nabla_2$, $\nabla_3$, $\nabla_4$, and $\nabla_5$, corresponding to constraints which apply to the cube of dimensions P×Q×K of hyperspectral image x, respectively in the vertical (P), horizontal (H), and diagonal directions of space, and in the spectral direction (K), expressed as follows:

$$(\nabla_1 x)_{p,q,k} = \begin{cases} x_{p+1,q,k} - x_{p,q,k}, & p < P, \\ 0, & p = P, \end{cases}$$

$$(\nabla_2 x)_{p,q,k} = \begin{cases} x_{p,q+1,k} - x_{p,q,k}, & q < Q, \\ 0, & q = Q, \end{cases}$$

$$(\nabla_3 x)_{p,q,k} = \begin{cases} x_{p+1,q+1,k} - x_{p,q,k}, & p < P \cap q < Q, \\ 0, & p = P \cup q = Q, \end{cases}$$

$$(\nabla_4 x)_{p,q,k} = \begin{cases} x_{p+1,q-1,k}, x_{p,q,k}, & p < P \cap q > 1, \\ 0, & p = P \cup q = 1, \end{cases}$$

$$(\nabla_5 x)_{p,q,k} = \begin{cases} x_{p,q,k+1} - x_{p,q,k}, & k < K, \\ 0, & k = K, \end{cases}$$

Operator J(x) may for example be defined by the following formula:

$$J(x) = \|\Psi \nabla_5 x\|_1 + \sum_{i=1}^{4} \|\nabla_i x\|_1,$$

where Ψ designates a selected bidimensional wavelet transform operator.

As a variation, operator J(x) may take other forms. For example, operator J(x) may be an operator enabling, by using the so-called nuclear standard, to minimize the number of different spectral signatures in the reconstructed data.

Further, rather than reconstructing the complete hyperspectral image (one intensity value per pixel and per spectral band), it may be provided to reconstruct data directly usable by the considered application, for example, a map of materials, or indications relative to the presence or not of certain phenomena or objects in the hyperspectral image.

An advantage of the provided acquisition system and method is that they enable to acquire hyperspectral images having a spatial resolution greater than that of the sensor and/or having a number of different spectral bands greater than the number of acquisitions performed by the sensor, in a particularly simple way. In particular, the acquisition of a hyperspectral image having a resolution greater than that of the sensor can be performed by a system comprising neither prism, no coded-aperture matrix shutter device.

Another major advantage is that, during the acquisition, no spectral filtering is performed, which implies that the selection of the reconstructed bands does not depend on the acquisition, but only results from a choice made at the time of the reconstruction. It is thus possible, based on a same series of M images $y_m$ of a scene acquired by sensor 101, to select the number and the position of the reconstructed bands. A compromise should of course often be made between the size of the spectral bands, their number, the spatial resolution of the reconstructed image, and the quality/reliability of the reconstructed image.

Whatever the method selected to reconstruct hyperspectral image x based on the M images $y_m$ acquired by sensor 101, it is necessary to know the different PSFs $h_{m,\lambda k}$ of element 105. PSFs $h_{m,\lambda k}$ may for example be determined during a system calibration phase, or be determined by simulation based on theoretical models of response of element 105, or also be determined by a method combining calibration and simulation.

Figure 3:
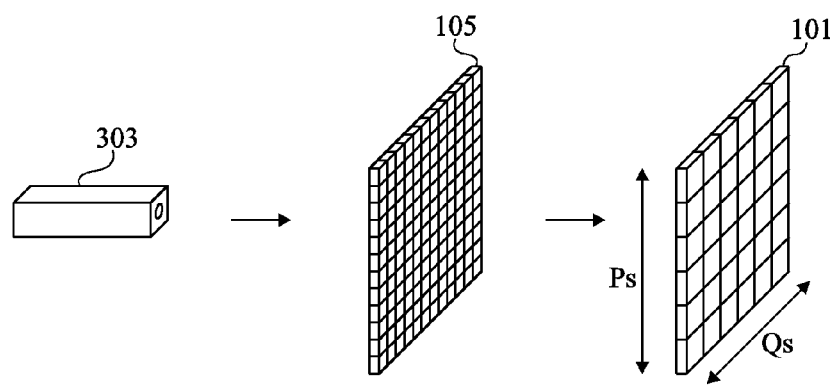
FIG. 3 schematically and partially shows the hyperspectral image acquisition system of FIG. 1 during a calibration phase.

FIG. 3 schematically and partially illustrates the hyperspectral image acquisition system of FIG. 1 during a calibration phase enabling to determine the different PSFs $hm_{,\lambda_k}$ of element 105.

In this example, object 103 of FIG. 1 is replaced with a point light source 303 having a settable wavelength, enabling to successively scan the K spectral bands $\lambda_k$ of the hyperspectral images which are desired to be acquired. Source 303 for example is a laser source having a settable wavelength. As a variation, source 303 may comprise a wide-band source coupled to a plurality of optical bandpass filters capable of being individually activated, corresponding to the different spectral bands of the hyperspectral images which are desired to be acquired.

During a calibration phase, it may first be provided to apply set $C_1$ of control signals to element 105 and to control source 303 to only emit in spectral band $\lambda_1$. An image can then be acquired by sensor 101, defining PSF $h_1,\lambda_1$ of element 105 for set $C_1$ of control signals and for wavelength $\lambda_1$. The operation may be repeated K times without modifying the set of control signals of element 105 but by each time modifying the emission wavelength of the source, to go through the K spectral bands of the hyperspectral images which are desired to be acquired. The entire operation can then be repeated M times by each time modifying the set of control signals applied to element 105 to use the M controls $C_m$ capable of being applied to element 105 and thus obtain the M×K PSFs $h_{m,\lambda_k}$ of element 105.

This method enables to obtain PSFs $h_{m,\lambda_k}$ having a granularity level or discretization step identical to that of sensor 101, and having a noise level corresponding to that of the sensor. It may however be advantageous to define PSFs $h_{m,\lambda_k}$ with a discretization step smaller than that of the sensor and/or with a noise level lower than that of the sensor (particularly if a hyperspectral image having a spatial resolution greater than that of the sensor or having a number of elementary images $x_{\lambda_k}$ greater than the number of images $y_m$ acquired by the sensor is desired to be reconstructed). To achieve this, the PSFs may be determined by simulation, by means of a theoretical behavior model of element 105.

Another particularly advantageous method for determining PSFs $h_{m,\lambda_k}$, combining calibration and simulation, will now be described.

To begin with, M×K images $hs_{m,\lambda_k}$ corresponding to the M×K PSFs of element 105 at the resolution of sensor 101, may be acquired by using a source of a settable wavelength according to the above-mentioned calibration method. It is then provided to pool the information collected during this acquisition phase to decrease the noise and possibly increase the resolution of the acquired PSFs.

For each band of wavelengths $\lambda_k$ of the hyperspectral images which are desired to be acquired, a theoretical behavior model $h_{\lambda_k}(\Omega)$ may be defined, where $\Omega$ designates a set of a limited number of parameters of element 105. Theoretical model $h_{\lambda_k}(\Omega)$ may for example have a discretization step smaller than that of sensor 101.

For each set of control signals $C_m$ of element 105, the performed measurements $hs_{m,\lambda_k}$ are put in correspondence with theoretical behavior model $h_{\lambda_k}$ to determine a set of parameters $\Omega_m$ defining the real behavior of element 105 for set $C_m$ of control signals. Set $\Omega_m$ may be determined by means of an error minimization algorithm, for example, an iterative algorithm, solving the following minimization problem (in the case where the effect of a Gaussian-type noise is desired to be decreased):

$$\Omega_m = \mathrm{argmin}_\Omega \left( C(\Omega) + \gamma \sum_{k=1}^{K} \|hs_{m,\lambda_k} - D_s h_{\lambda_k}(\Omega)\|_2^2 \right),$$

where $D_s$ is a decimation operator corresponding to the averaging performed by sensor 101 during the acquisition, with respect to an image having the same resolution as theoretical model $h_{\lambda_k}$, where $\gamma$ is a scalar regularization parameter, and where $C(\Omega)$ is an operator of constraints on a set of parameters $\Omega$.

Each of the M×K PSFs $h_{m,\lambda_k}$ of element 105 can then be determined by the following formula:

$$h_{m,\lambda_k} = h_{\lambda_k}(\Omega_m).$$

This enables to take into account possible imperfections of the acquisition system which cannot be modeled by means of theoretical preconceptions. Advantageously, an interpolation and smoothing function I may be applied. PSFs $h_{m,\lambda_k}$ of element 105 can then be determined by the following formula:

$$h_{m,\lambda_k} = h_{\lambda_k}(\Omega_m) - I_s(hs_{m,\lambda_k} - D_s h_{\lambda_k}(\Omega_m)).$$

Specific embodiments have been described. Various alterations, modifications, and improvements will readily occur to those skilled in the art.

In particular, a new solution enabling to acquire hyperspectral images has been provided. Based on the above-described teachings, it will be within the abilities of those skilled in the art to adapt certain aspects of the described method and system according to the targeted application. For example, although only embodiments where diffuser and dispersive element 105 operates in transmission mode have been shown in the drawings, the described embodiments are not limited to this specific case. Thus, an acquisition system of the type described in relation with FIGS. 1 to 3, where element 105 operates in reflection mode, may be provided.

The invention claimed is:

1. A system for acquiring a hyperspectral image, comprising:
    an image sensor;
    a diffusion and dispersive element placed on the optical path between the sensor and a scene, this element comprising an array of liquid crystal cells, each cell being individually controllable to vary its refraction index;
    a control unit capable of controlling the sensor and the element to successively acquire an integral number M greater than 1 of elementary images of the scene, by modifying between two successive acquisitions a set of control signals applied to the different cells of the element; and
    a processing unit capable of reconstructing the hyperspectral image based on the M elementary images acquired by the sensor.

2. The system of claim 1, wherein, for each set of control signals applied to the element, the element has different point spread functions for different spectral bands of the hyperspectral image.

3. The system of claim 2, wherein the M sets of control signals applied to the diffuser and dispersive element are such that the acquisition matrix, formed by the concatenation of the representations of the M×K point spread functions of the element, corresponding to the M applied sets of control signals and to K spectral bands of the hyperspectral image, K being an integer greater than 1, is of maximum rank relative to its size.

4. The system of claim 2, wherein the M sets of control signals applied to the diffuser and dispersive element are such that the MK point spread functions of the element corresponding to the M applied sets of control signals and to K spectral bands of the hyperspectral image, K being an integer greater than 1, are all different from one another.

5. A method of controlling a system for acquiring a hyperspectral image which comprises an image sensor; a diffusion and dispersive element placed on the optical path between the sensor and a scene, this element comprising an array of liquid crystal cells, each cell being individually controllable to vary its refraction index; a control unit capable of controlling the sensor and the element to successively acquire an integral number M greater than 1 of elementary images of the scene, by modifying between two successive acquisitions a set of control signals applied to the different cells of the element; and a processing unit capable of reconstructing the hyperspectral image based on the M elementary images acquired by the sensor, the method comprising an acquisition phase during which the sensor and the element are controlled to successively acquire an integral number M greater than 1 of elementary images of the scene, by modifying between two successive acquisitions the set of control signals applied to the different cells of the element.

6. The method of claim 5, further comprising a phase of reconstructing the hyperspectral image from the M elementary images acquired during the acquisition phase.

7. The method of claim 5, further comprising a previous calibration phase during which the M×K point spread functions of the element, corresponding to the M applied sets of control signals and to K spectral bands of the hyperspectral image, K being an integer greater than 1, are determined.

8. The method of claim 7, wherein the calibration phase comprises the acquisition successively by the sensor of M×K images of spots resulting from the diffusion, by the element, for the M sets of control signals of the element and for the K light spectral bands of the hyperspectral image, of a point light source having a settable wavelength.

9. The method of claim 8, wherein the M×K images acquired during the calibration phase are matched with a theoretical behavior model of the element.

10. The method of claim 5, wherein the system, for each set of control signals applied to the element, the element has different point spread functions for different spectral bands of the hyperspectral image.

11. The method of claim 10, further comprising a phase of reconstructing the hyperspectral image from the M elementary images acquired during the acquisition phase.

12. The method of claim 10, further comprising a previous calibration phase during which the M×K point spread functions of the element, corresponding to the M applied sets of control signals and to K spectral bands of the hyperspectral image, K being an integer greater than 1, are determined.

13. The method of claim 10, further comprising a phase of reconstructing the hyperspectral image from the M elementary images acquired during the acquisition phase.

14. The method of claim 5, wherein the system, for each set of control signals applied to the element, the element has different point spread functions for different spectral bands of the hyperspectral image, wherein the M sets of control signals applied to the diffuser and dispersive element are such that the acquisition matrix, formed by the concatenation of the representations of the M×K point spread functions of the element, corresponding to the M applied sets of control signals and to K spectral bands of the hyperspectral image, K being an integer greater than 1, is of maximum rank relative to its size.

15. The method of claim 14, further comprising a phase of reconstructing the hyperspectral image from the M elementary images acquired during the acquisition phase.

16. The method of claim 14, further comprising a previous calibration phase during which the M×K point spread functions of the element, corresponding to the M applied sets of control signals and to K spectral bands of the hyperspectral image, K being an integer greater than 1, are determined.

17. The method of claim 14, further comprising a phase of reconstructing the hyperspectral image from the M elementary images acquired during the acquisition phase.

18. The method of claim 5, wherein the system, for each set of control signals applied to the element, the element has different point spread functions for different spectral bands of the hyperspectral image wherein the M sets of control signals applied to the diffuser and dispersive element are such that the MK point spread functions of the element corresponding to the M applied sets of control signals and to K spectral bands of the hyperspectral image, K being an integer greater than 1, are all different from one another.

19. The method of claim 18, further comprising a phase of reconstructing the hyperspectral image from the M elementary images acquired during the acquisition phase.

20. The method of claim 18, further comprising a previous calibration phase during which the M×K point spread functions of the element, corresponding to the M applied sets of control signals and to K spectral bands of the hyperspectral image, K being an integer greater than 1, are determined.

* * * * *